Jan. 30, 1968  W. F. WALDECK  3,366,450
PROCESS FOR SLAKING HIGH CALCIUM QUICKLIME
Filed May 22, 1964
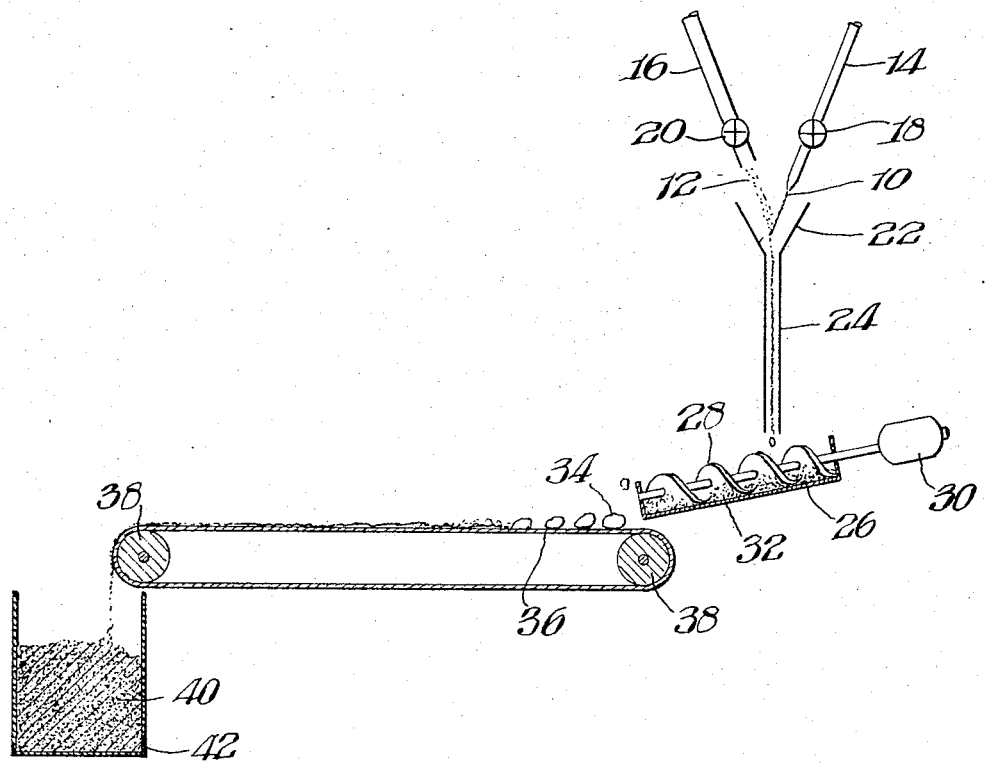
INVENTOR:
William F. Waldeck
BY Connolly and Hutz
ATTORNEYS

United States Patent Office 3,366,450
Patented Jan. 30, 1968

3,366,450
PROCESS FOR SLAKING HIGH
CALCIUM QUICKLIME
William F. Waldeck, Milford, N.J., assignor to Chas.
Pfizer & Co., Inc., New York, N.Y., a corporation
of Delaware
Filed May 22, 1964, Ser. No. 369,378
15 Claims. (Cl. 23—188)

ABSTRACT OF THE DISCLOSURE

A vigorous hydration of high calcium quicklime is conducted with water at a temperature of at least about $(65-1.7A)$ ° C. where A is the quicklime activity. Sufficient water is employed to provide at least 16% free moisture in the moist hydrate, and the hydrate is then flash-dried. Special conditions for continuous operation are defined.

---

This invention is concerned with the hydration or slaking of high calcium quicklime, and more particularly with an improved process for the preparation of dry plastic lime hydrate of superior properties.

A prime indication of the plastering properties of lime hydrate is given by the Emley Plasticity (ASTM Standard Method C110-58 "Physical Testing of Quicklime and Hydrated Lime," Sections 7-8). Plasticity is a measure of the slip of a lime putty and the resistance to loss of moisture from the putty to an absorbant surface. The scale begins at 100 and ranges upward, the higher values indicating superior working qualities.

In the past, dolomitic lime hydrates having plasticity values as high as 400 have been prepared. So far as I can determine, however, the patent and technical literature disclose no process capable of converting high calcium quicklime to such excellent hydrate.

I have now discovered a process which provides high calcium lime hydrate characterized by plasticity values ranging as high as 500 and beyond. In addition, the products of the new process are superior to the best dolomitic hydrate with respect to water requirement. Thus, in order to achieve a standard plastering consistency, most lime hydrates require the addition of water equal to about 85–110% of their dry weight, whereas my hydrates tolerate up to 150–170% water for the same consistency. This, of course, affords an important saving, since about one-third more lime putty is obtained from a given weight of hydrate, with equivalent results. Furthermore, the new hydrates, unlike those employed in the past, yield putties of remarkably uniform consistency over a broad range of water content.

One critical feature of the new process is the use of highly active quicklime, or the use of hot slake water to compensate for lime of lesser activity. I express these interrelated criteria quantitatively by the equation $$T = 65 - 1.7A$$

where T is the minimum acceptable slake water temperature in ° C. for the new process, and A is the activity of the quicklime as determined by ASTM Standard Method C110-58 (Sections 20-22, Tentative Revision issued June 1960: 30-second temperature rise in ° C. as specified for high calcium lime).

An unusually vigorous reaction ensues under the aforementioned conditions and I have found it essential to employ at least sufficient water, over and above that required to convert the calcium oxide to calcium hydroxide, and that which is lost by evaporation during the hydration, to leave a free moisture content of at least about 16% by weight in the hydrate produced. I find that particularly good results are obtained if 19% or more remains. There is no critical upper limit on the free moisture content, but beyond 36% I find no added advantage to compensate for the extra cost of subsequent drying. Of course, the proportion of water which must be introduced to the process to meet these criteria will vary somewhat with the processing details, since substantial evaporation occurs under the vigorous reaction conditions employed. Accordingly, the proportion of water introduced is best determined by experiment under actual operating conditions.

The seemingly contradictory features of an extremely vigorous hydration, assured by the lime activity—slake water temperature relation, and the use of a copious supply of slake water, are among the most important aspects of the new process. However, other critical conditions are also essential to success.

A further critical feature is the subsequent flash-drying of the moist hydrate produced. By flash-drying, I mean drying by dispersing the hydrate in a heated gas stream maintained above the boiling point of water, whereby the moist solid is dried with further increase in internal porosity as a result of the rapid vaporization of contained moisture. Various types of drying equipment are commercially available and suitable for this purpose, including a number of pneumatic conveying dryers with or without provision for simultaneous disintegration or grinding by means of hammer mills, cage mills or the like. If disintegrative drying is not employed, it may be desirable to subject the dried hydrate to a separate, conventional impact milling step to meet particle size specifications. The heated gas used for drying may be air, or it may, for example, be flue gas, the carbon dioxide content being of little consequence. I find that best results are achieved when the drying step follows hydration within about 48 hours, when the solids temperature during drying is about 115–125° C., and when the hydrate is dried to a moisture content below about 0.4% by weight. These three factors represent preferred process conditions, since they contribute further to the quality and stability of the product, although excellent results are also obtained outside these ranges.

Additional aspects of the hydration step merit further consideration. It is, of course, possible to carry out this reaction as a batch process, i.e. by simply agitating the quicklime and water to form the moist hydrate. While this method is entirely satisfactory on a laboratory scale, it leaves a great deal to be desired from the standpoint of economic, commercial production. Accordingly, I have developed an elegant and novel, continuous lime hydration process, which constitutes a further feature of the present invention.

It might at first appear a straightforward matter to hydrate quicklime continuously under the conditions described. Others have, for example, simply discharged quicklime and water into a hydrator containing partially reacted lime hydrate. I have discovered, however, that such processing is fatal to the attainment of optimum plasticity. If fresh quicklime comes into contact with partially reacted hydrate, I believe that many lime particles will gradually abstract water from the moist solid or paste, leading to a low water:lime ratio during much of the reaction and consequent steam-slaking within the particle. I do not, however, wish to be bound by this theory, the validity of which is of no consequence to a full and adequate understanding of the invention.

Successful, continuous lime hydration entails a close approximation of batch processing conditions, by the combination of co-current flowing streams of water and particulate quicklime, assuring that each particle of lime is bathed in a copious supply of water. The particle size of the quicklime is surprisingly unimportant, and excellent results have been attained with lumps ¾ inch in diameter as well as with material finer than 30 mesh. Quicklime of 6–30 mesh flows well, and being readily obtainable, is eminently suitable.

In order to avoid the mediocre product quality which would otherwise result, the quicklime-water mixture should be promptly withdrawn from the zone of initial contact. This can be effected conveniently by gravity, employing an open vertical tube, preferably having a flared, upper inlet into which the reactant streams are directed. The mixture which emerges from the lower end of the tube will be found to be quite hot, typically 70–85° C., indicating that the hydration reaction is already in progress.

The reacting mixture may be introduced into an open trough provided with a horizontal paddle, sigma bar mixer or ribbon-type blender, to complete the hydration and move the moist product to a point of discharge. I find, however, that this is attended by substantial problems of a mechanical nature. As much of the moisture is consumed by chemical combination with the calcium oxide, as well as by evaporation, the reaction mixture tends to form a cake which hardens on the inner surface of the trough, subjecting the agitator blades to very severe strain. It is greatly preferable to allow the hydration to proceed to completion on a moving belt on which the moist solid remains quiescent. This has the important advantages of mechanical simplicity, extremely low power requirement and substantially complete freedom from dust. A very short mixing trough may be interposed between the vertical mixing tube and the belt, to insure complete homogenizing, but the paste should be discharged from the trough while it is still soft.

The apparatus for such a process is depicted schematically and partially in section in the drawing. A stream of water 10 and a stream of particulate quicklime 12 are each discharged by gravity from substantially vertical pipes 14 and 16, provided respectively with valves 18 and 20 and connected to separate tanks or other supply sources, not shown. The confluent streams meet in funnel 22 mounted by conventional support means, not shown, and provided with substantially vertical tailpipe 24. The reacting mixture passes downward through pipe 24 and discharges by gravity to short open trough 26, provided with a substantially horizontal, journaled agitator 28 driven by power source 30. The hot hydration mixture 32 is homogenized briefly (10–15 seconds) and discharges as soft chunks 34 to moving belt 36 provided with terminal pulleys 38 driven by a power source, not shown. During about 2 minutes' travel on belt 36 the hydrate chunks swell and disintegrate as hydration proceeds and steam is evolved. The moist hydrate then discharges by gravity as a superficially dry powder 40 into drum 42, ready for flash-drying as already described.

The new process affords a maximum disruptive or disintegrative effect from the vigor of the reaction, while yet minimizing steam slaking, to produce high calcium lime hydrate of unprecedented quality, well within the requirements for type S quick plasticity lime hydrate, as given in ASTM Specification C206–49.

As employed herein and in the appended claims, the expression "high calcium" quicklime refers to lime containing less than 15% magnesium oxide, as distinguished from dolomitic lime. High calcium quicklime most commonly contains about 1–5% magnesium oxide.

The following examples are provided for illustrative purposes and should not be construed as limiting the invention, the scope of which is indicated by the appended claims.

*Example 1*

High-calcium quicklime of 14° activity (ASTM C110–58 Section 20–22, 30-second temperature rise, °C.) is slaked batchwise employing a laboratory paddle mixer and sufficient water to yield a moist hydrate containing about 20% free water. The product is then simultaneously milled and flash-dried in a Raymond impact mill ("Imp Mill") with peripheral feed, the conventional rubber gaskets being replaced by asbestos, and an ordinary laboratory Meeker gas burner being mounted within 6 inches of the axial air inlet so that the flame is sucked into the mill and the solids are heated to about 240–250° F. A series of experiments is conducted in this way, employing slake water at various initial temperatures, to observe the effect of this factor. The properties of the dry hydrates obtained are as follows:

|   | Initial Slake Water Temperature, ° C. | Emley Plasticity | Water Requirement,* Percent | Struck Density, lb./ft.³ |
|---|---|---|---|---|
| A | 10 | 190 | 55 | 35.5 |
| B | 20 | 280 | 70 | 25.5 |
| C | 30 | 285 | 85 | 20.5 |
| D | 40 | 310 | 100 | 17.5 |
| E | 50 | 405 | 140 | 16 |
| F | 60 | 440 | 170 | 12.5 |

*Weight percent based on dry hydrate to achieve standard consistency in the Plasticity test. ASTM C110–58 Section 6.

For quicklime of this activity, it is found that slake water temperatures of 50° C. and higher yield a low-density hydrate having a plasticity above 400 and an unusually high water requirement.

*Example 2*

A number of 6–30 mesh high-calcium quicklime samples varying in ASTM activity value are slaked with sufficient water to obtain moist hydrate of 19–22% free moisture. In each case, substantially vertical streams of quicklime and water are introduced simultaneously to a funnel having a 24-inch vertical tailpipe which feeds by gravity to a 10-inch long, open-top, horizontal trough provided with a horizontal paddle mixer. The water is fed to the funnel at about 0.86 gal./min. and the quicklime at 7.5–8 lb./min. The moist hydrate enters the trough at about 70–85° C. indicating that substantial reaction has already begun in the vertical mixing tube. After a 10–15 second holdup in the trough, the homogenized cake is discharged in the form of soft, moist chunks to a moving belt. During two minutes' travel on the belt before being dropped into drums, the hydrate lumps swell and fall apart into powder as hydration proceeds and the temperature rises above 100° C. with evolution of steam. The operation is essentially dust-free.

Each sample of moist hydrate is flash-dried in an 18-inch vertical Raymond impact mill furnished with a propane gas flame at the air inlet to provide a solids temperature of 115–125° C. The dry hydrate thus obtained has a moisture content of about 0.3%, a residue on 200 mesh of about 5%, and a carbon dioxide content of about 2.5%. The plasticities of the various dry hydrate samples produced are as follows:

| Initial Slake Water Temperature, ° C. | Quicklime Activity (A)[1] (degrees) | Emley Plasticity |
|---|---|---|
| 60 | 3 | 375 |
| 40 | 16 | 375 |
| 60 | 13 | 400 |
| 40 | 22 | 400 |
| 35 | 24.5 | 400 |
| 10 | 36 | 400 |

[1] ASTM C110–58 Section 20–22.

In contrast to these results, a high-calcium quicklime of 42° ASTM activity gives a poor product (plasticity below 200) even when slaked with ice water at 2° C.

Example 3

A series of batchwise hydrations are conducted as in Example 1, employing high-calcium quicklime of 21° ASTM activity and slake water initially at 32° C. This time the proportion of slake water is varied to provide moist hydrates of varying moisture content. Each hydrate is flash-dried as in Example 1 and the plasticities of the dry hydrate determined, with results as follows:

| Free water content of moist hydrate, percent by wt.: | Emley plasticity |
|---|---|
| 15.5 | 195 |
| 17.8 | 270 |
| 19.4 | 451 |
| 20.1 | 415 |
| 23.2 | 519 |
| 23.5 | 450 |
| 25.3 | 461 |

A notably enhanced plasticity is observed where the water content of the moist hydrate exceeds 16%, and particularly at 19% and higher.

Example 4

Another series of experiments is conducted as in Example 3 but employing the continuous hydration technique described in Example 2. This time a high-calcium quicklime powder of 24° activity is employed with a slake water temperature of 26–27° C. Results are as follows:

| Free Water Content of Moist Hydrate [1] (Percent) | Emley Plasticity of Dried Hydrate | Water Requirement of Dried Hydrate [2] (Percent) |
|---|---|---|
| 16.5 | 305 | 119 |
| 18 | 370 | 125 |
| 20 | 380 | 127 |
| 21.5 | 420 | 141 |
| 22.7 | 500 | 153.5 |
| 26.3 | 490 | Not determined |
| 32.5 | 525 | Not determined |
| 36.3 | 445 | Not determined |

[1] Weight percent of total, measured dropping into drum at end of hydration belt.
[2] Weight percent based on dry hydrate to achieve standard consistency in the plasticity test. ASTM C110-58 Section 6.

Example 5

A sample of moist lime hydrate having a free water content of 23.2% and prepared by hydration as described in Example 3 is oven-dried to a moisture content of about 0.2% and then milled in the Raymond mill without heat. The dry milled hydrate is found to have an Emley plasticity of only 194 and a water requirement of only 73% by weight of the dry hydrate. By contrast, the sample which is flash-dried to 0.2% moisture as described in Example 3 has a plasticity of 519 and a water requirement of 147%.

Example 6

Another sample of the moist lime hydrate of Example 5 is flash-dried without milling while suspended in hot air in a Jet-O-Drier (manufactured by the Fluid Energy Processing & Equipment Company of Philadelphia). The hot air is introduced at 1 lb./in.² gauge pressure. The product is found to have an Emley plasticity of 452 and a residue on 200 mesh of 26%. The latter value is reduced to 5% by milling in a hammer mill without heat.

Example 7

A sample of moist hydrate produced by the procedure of Example 2 is promptly flash-dried as described in that example to yield a dry hydrate having an Emley plasticity of 472. A second sample of the same moist hydrate is stored for 40 hours and then flash-dried, yielding a plasticity of 430.

Example 8

Product E of Example 1 is found to yield lime putties of good plastering consistency over the range of 6 to 8.5 gallons of water per 50 lb. dry hydrate. A typical commercial dolomitic lime hydrate is found to be substantially more sensitive, tolerating only 5–5.5 gallons per 50 lb. before becoming too thin to be acceptable.

What is claimed is:

1. An improved process for the production of dry plastic lime hydrate which comprises the steps of combining high calcium quicklime with sufficient water to provide a moist hydrate having a free moisture content of at least about 16% by weight, and flash-drying said moist hydrate at a solids temperature of about 115–125° C., said water being introduced at a temperature equal to at least about $(65-1.7A)$ ° C. where $A$ is the ASTM activity of said quicklime.

2. A process as in claim 1 wherein said free moisture content is in the range of from about 19 to 36% by weight.

3. A process as in claim 1 wherein said moist hydrate is flash-dried to a moisture content below about 0.4% by weight within about 48 hours of said hydration step.

4. A process as in claim 1 wherein the dry hydrate product is pulverized by impact milling.

5. A process as in claim 4 wherein said milling step is conducted simultaneously with said flash-drying step.

6. A continuous process for the production of dry plastic lime hydrate of enhanced plasticity and water requirement which comprises the steps of combining co-current streams of particulate high calcium quicklime and sufficient water to provide a moist hydrate having a free moisture content of at least about 16% by weight, and flash-drying said moist hydrate at a solids temperature of about 115–125° C., said water stream having a temperature equal to at least about $(65-1.7A)$ ° C. where $A$ is the ASTM activity of said quicklime.

7. A process as in claim 6 wherein said free moisture content is in the range of from about 19 to 36% by weight.

8. A process as in claim 6 wherein said moist hydrate is flash-dried to a moisture content below about 0.4% by weight within about 48 hours of said hydration step.

9. A process as in claim 6 wherein the dry hydrate product is pulverized by impact milling.

10. A process as in claim 9 wherein said milling step is conducted simultaneously with said flash-drying step.

11. A continuous process for the production of dry plastic lime hydrate characterized by an Emley putty plasticity of at least about 375, which process comprises the steps of confluently combining particulate high calcium quicklime with water in an initial contact zone, immediately removing said water-lime mixture from said contact zone, transferring said mixture to a quiescent hydration zone and subsequently flash-drying said hydrated mixture at a solids temperature of about 115–125° C., said water being introduced at a temperature equal to at least about $(65-1.7A)$ ° C., where $A$ is the ASTM activity of said quicklime, and in such proportion as to provide a free moisture content between about 19 and 36% by weight of said hydrated mixture.

12. A process as in claim 1 wherein said water-lime mixture is removed from said initial contact zone by gravity.

13. A process as in claim 1 wherein an agitation zone is interposed between said initial contact zone and said hydration zone.

14. In a process for hydrating particulate high calcium quicklime under vigorous slaking conditions, the improvement which comprises the steps of combining said quicklime with water in an initial contact zone, immediately removing said water-lime mixture from said contact zone, quickly homogenizing said mixture in an agitation zone, transferring said homogenized mixture to a quiescent zone to complete hydration, and subjecting said hydrated mixture to disintegrative flash-drying at a solids temperature of about 115–125° C. within about 48 hours, said water being introduced at a temperature equal to at least about $(65-1.7A)$ ° C., where $A$ is the ASTM activity of said quicklime, and in such proportion as to provide a free moisture content between about 19 and 36% by weight of said hydrated mixture.

15. A process as in claim 14 wherein said drying is conducted to a free moisture content below about 0.4% by weight.

References Cited

UNITED STATES PATENTS

| | | | |
|---|---|---|---|
| 800,635 | 10/1905 | Ellis | 23—188 |
| 2,309,168 | 1/1943 | Corson | 23—188 |
| 2,784,062 | 3/1957 | Locke et al. | 23—188 |
| 2,894,820 | 7/1959 | Rikard et al. | 23—188 |

EDWARD J. MEROS, *Primary Examiner.*

OSCAR R. VERTIZ, *Examiner.*